3,231,645
METHOD OF MAKING IRIDESCENT
PLASTIC SHEETS
René A. Bolomey, Peekskill, N.Y., assignor to The Mearl Corporation, Ossining, N.Y., a corporation of New York
No Drawing. Filed May 21, 1962, Ser. No. 196,497
5 Claims. (Cl. 264—73)

This invention relates to iridescent cast plastics containing nacreous pigments integral therewith, and to a method of preparing the same.

Nacreous pigments which have colors because of light interference phenomena are described in a co-pending patent application, Serial No. 60,793, now Patent No. 3,123,485, granted on March 3, 1964, owned by applicant's assignee. It is convenient to speak of these materials as being "optically colored." Such pigments consist of small, plate-like particles whose thickness is of such size that color is produced by light interference phenomena. The thickness which gives rise to a particular color is determined by the index of refraction of the substance. Thus, for basic lead carbonate, which has an index of refraction of 2.09, a yellow-reflecting platelet has a thickness of approximately 105 millimicrons ($m\mu$), a red-reflecting platelet a thickness of approximately 124 $m\mu$, a blue-reflecting platelet a thickness of approximately 138 $m\mu$, and a green-reflecting platelet a thickness of approximately 155$m\mu$. These values are derived from the known equations which describe light interference effects and which are referred to in the aforesaid co-pending application, wherein it is also pointed out that the multiplication product of platelet index of refraction and platelet thickness is at least 200 and preferably 200 to 400, where thickness is expressed in millimicrons.

Because these colors arise from light interference rather than from light absorption, as in the case of conventional dyes or pigments, the light which is transmitted through the platelet has the color which is complementary to the reflected light. That is, the yellow-reflecting platelet transmits blue or violet, the red-reflecting platelet transmits green, the blue-reflecting platelet transmits orange or yellow, and the green-reflecting platelet transmits red. It is desirable to use platelets which produce different colors in combination with each other. A layer of green-reflecting platelets under red-reflecting platelets intensifies the green transmission color of the latter. This type of behavior is clearly distinct from that of conventional colorants, admixtures of which only darken and muddy the individual colors.

Furthermore, combinations of platelets with non-complementary colors widen the rainbow-like effect and more closely approach the natural iridescence of mother-of-pearl.

Among the substances which are suitable for the production of interference colors are crystals which are capable of growth in the form of nacreous platelets having smooth surfaces and uniform thicknesses. Among these are lead hydrogen arsenate, basic lead carbonate, bismuth oxychloride, mercurous formate, zinc phosphate, zinc sulfide, cytosine, and DL-tryptophan. All of these substances can be crystallized as platelets which have color when they have the proper thickness. For practical purposes, the platelet should have an index of refraction which differs as much as possible from the substance in which it will be embedded in use, since the intensity of the reflected light is a function of the difference in refractive index between the platelet crystal and the surrounding medium. Generally the platelets should have an index of refraction of at least 1.70.

Cast plastic sheets having one or more nacreous pigments formed integrally therein have heretofore been made by a variety of techniques. One known technique, cell casting, involves pouring a suspension of the platelets of the nacreous material in a polymerizable liquid into a cell, the cavity of which has the shape of the finished sheet. Upon curing, the resin sets to form the cast sheet.

Another known method for producing nacreous cast sheets involves centrifugal or rotational casting, in which a suspension of the platelets in a polymerizable liquid is poured into a rotating cylinder and is distributed evenly over the walls of the cylinder by centrifugal force. The platelets become oriented parallel to the wall of the cylinder. After the plastic has gelled the cast sheet, made by conventional rotational casting, is sliced open and laid while still flexible, on a flat surface. The sheet is then cured until hard, resulting in a cast pearlescent sheet in which the nacreous platelets are uniformly oriented parallel to the surface of the sheet. Heretofore only one color or combination of complementary colors could be produced in cast plastic sheets by this known rotational procedure.

A method has recently been described in co-pending application Serial No. 117,824, assigned to the assignee of the present application, involving the formation of layers of platelets which have different interference colors, i.e. different optical colors, by laminating cast sheets containing platelets of different colors, or in centrifugal casting by centrifugally forming a plurality of layers containing platelets of different colors, to thereby create a laminated structure having adjacent layers of various optical colors. Individual colored layers are made visible by cutting or polishing of the resulting cast sheets in order that the several colored layers are revealed, producing a pattern having concentric colored rings or the like.

It is among the objects of the present invention to provide a process for the preparation of iridescent cast plastic sheets containing nacreous pigments, without the necessity of forming separate laminae of plastic materials containing different colored nacreous pigments.

It is a further object of the invention to provide such a process which is readily practiced and which produces a plastic iridescent sheet which simulates the appearance of mother-of-pearl.

Other objects and advantages of the present invention will be apparent from the following description thereof.

In accordance with this invention, iridescent cast plastics are prepared with multiple color effects by distributing suspensions of nacre-producing platelets within a rotating casting member, the platelet suspensions being dispensed axially of the casting member during rotation thereof to form a helical pattern of the nacre-producing platelets, which platelets have smooth surfaces and uniform thicknesses such that colors are produced by optical interference phenomena on reflection and transmission of light by the platelets. By thus applying a plurality of suspensions containing platelets having different ranges of thicknesses in spiral patterns, multiple color effects are produced.

Iridescent cast plastic sheets containing nacreous pigments are thereby produced without the necessity for initially producing a laminated structure having adjacent layers of different optical colors and thereafter cutting or polishing the sheet to reveal the various colored layers. According to the invention, the multiple colored plastic sheets are rather produced in a single layer which possesses pleasing, linearly directed, multiple color patterns.

Nacreous platelets of any of the pigments identified above may be employed in the practice of this invention, as may be any pigment which derives its color from an interference effect, regardless of the specific dimensions of the pigment particles, whether crystalline or amorphous. Typical cast plastic materials which are so useful include polyester resins, epoxies, acrylics such as polymethyl methacrylate, polystyrene, phenol-formaldehyde, and melamine and urea-formaldahyde resins. It will be apparent to those skilled in the art that other light transmitting cast plastics can also be used, so long as the index of refraction thereof is in the preferred range of from about 1.4 to 1.65.

The suspensions of nacreous pigments employed in the practice of this invention generally contain pigment concentrations varying from about 0.7 to about 2% by weight. Upon distribution axially of a rotating casting cylinder, the pigment suspensions form helical patterns which may be parallel to one another or which may cross one another to form intersecting patterns, depending upon whether the pigment suspensions are dispensed uni- or bi-directionally of the axis of the cylinder; in either case the thickness of the cast sheet which results, after splitting the tube formed by the above procedure, generally varies from about $\frac{1}{16}$ inch to about 1½ inches.

The present invention will be more fully understood from a consideration of the following examples illustrating preferred embodiments thereof; it will be appreciated that the invention is not limited to these examples.

*Example I*

A 35% suspension of red-reflecting platelets of basic lead carbonate in dibutyl phthalate was dispersed in a polyester casting resin ("Plaskon PE-205," sold by Allied Chemical Corporation) to form a suspension containing about two dry weight percent crystals. The suspension was mixed with 0.1% by weight of a cobalt naphthenate accelerator ("Hexogen Cobalt," sold by Advanced Solvents and Chemical Division; Carlisle Chemical Works); similar results have been obtained with cobalt octoate or other known lead, manganese or cobalt salt accelerators. To the mixture five ml. of methyl ethyl ketone peroxide catalyst per 500 grams of the resin, was added. After the addition of the peroxide, the resin mixture was stirred for about five minutes.

250 grams of the resulting curable suspension was poured into a cylinder 11.5 inches in diameter and 8.25 inches high, rotating at a speed of 147 r.p.m., with its axis horizontal. The fine stream of the plastic casting resin mixture was poured from the back to the front of the cylinder in a constant stream moved axially of the rotating cylinder; a thread of the resin mixture was thereby formed in the shape of a helical pattern.

Thereafter, a stream of a plastic casting mixture prepared as described above, but rather containing an equal amount by weight of a suspension of green-reflecting platelets of basic lead carbonate in dibutyl phthalate, was poured into the rotating cylinder in the manner described above.

The process was repeated once, employing the alternating color suspensions of the nacreous pigments. This procedure resulted in the deposition of parallel striations of red-deflecting and green-reflecting nacreous platelets. After allowing about 16 minutes to pour in the platelet suspensions, during which time a plastic tube was formed and partially cured, the tube was split, forming a sheet showing lines of intense color. The total gell time was thus about 21 minutes, and an iridescent cast plastic sheet was thereby produced having a thickness of about $\frac{3}{16}$ inch.

*Example II*

A 35% suspension of red-reflecting platelets of basic lead carbonate in dibutyl phthalate was dispersed in the polyester casting resin of Example I, to form a suspension containing about two dry weight percent of the platelet crystals; 0.1% of the cobalt naphthenate accelerator was added and thereafter the mixture was admixed with 2.5 ml. of methyl ethyl ketone peroxide catalyst per 500 grams of the resin employed. The decrease of the peroxide catalyst increased the total gell time required in the ensuing procedure to about 25 to 30 minutes.

The rotating cylinder described in Example I was rotated at 147 r.p.m. and, after the cylinder was set in motion, the suspension of the red-reflecting platelets was poured from the front to the back of the cylinder, then to the front again to form two sets of parallel striations which crossed one another. Distribution of a green-reflecting platelet suspension was effected in like manner employing a suspension differing solely from that described above in the presence of the green-reflecting platelets in place of the red-reflecting platelets; a pattern of two sets of intersecting parallel lines containing the green-reflecting platelets was thereby formed. There thus resulted a network of alternating threads of different colors across the length of the cast plastic and through the thickness of the sample formed.

Upon curing, the cast tube was split and a plastic sheet was formed having a multicolor linear striations therethrough, in which the colors were somewhat subdued in some areas due to overlapping of the red- and green-reflecting platelets, while in other areas the original color intensities remained.

Gold-reflecting platelets and blue-reflecting platelets of different thicknesses of basic lead carbonate pigment in dibutyl phthalate, dispersed in a plastic casting resin suspension, gave results similar to those described above, when cast by the procedures of Examples I and II.

According to the present invention pleasing iridescent patterns are created in cast plastic sheets by pouring suspensions of platelets of nacreous pigments axially of a rotating casting cylinder, to thereby form parallel or intersecting spiral patterns of the nacre-producing platelets.

The present process involves an inherent advantage in that blending of colors where the pigment platelets are superposed and overlap produces a light color or whiteness instead of the darkness which occurs when conventional coloring substances blend, and that adjacent colors enhance one another instead of producing progressive darkening. Moreover, the process of this invention additionally eliminates the necessity for the application of discrete layers of pigment platelets to produce iridescent effects, thereby conserving materials and facilitating a simpler more rapidly performed procedure.

The present procedure may, if desired, be combined with the procedure disclosed in the aforesaid co-pending application Serial No. 117,824 to produce pleasing iridescent effects in cast plastic sheets.

Since other changes may be made in carrying out the above described method without departing from the scope of this invention, it is intended that all matter contained in the preceding description shall be interpreted as illustrative and not in a limiting sense.

The embodiments of the invention in which an exclusive privilege or property is claimed are defined as follows:

1. A method of preparing an iridescent cast plastic article exhibiting color integral with said plastic article, comprising independently distributing a plurality of suspensions of nacre-producing platelets in light transmitting plastic vehicles within a rotating casting member by dispersing said suspensions while moving the feed source for each suspension in a direction along the axis of said member at such a rate in relation to the gel time of the plastic material as to yield a product in which substantially parallel striations corresponding to the several deposits of the respective suspensions of platelets are visible, said platelets having smooth surfaces and uniform thicknesses such that colors are produced by optical intereference phenomena on reflection and transmission of light by said platelets, curing the light transmitting plastic, removing the cast plastic article thus formed from said rotating casting member and slicing the article lengthwise thereof to produce an iridescent cast plastic article exhibiting color integral therewith.

2. In the method of preparing an iridescent cast plastic sheet exhibiting multiple colors integral with said plastic sheet, the steps comprising distributing a plurality of suspensions of nacre-producing platelets in a light transmitting plastic material within a rotating cylinder by dispensing said suspensions while moving the feed source for each suspension in a direction along the axis of said cylinder at such a rate in relation to the gel time of the plastic material as to yield a product in which substantially parallel striations corresponding to the several deposits of the respective suspensions of platelets are visible, said platelets having smooth surfaces and uniform thicknesses such that colors are produced by optical interference phenomena on reflection and transmission of light by said platelets, and said suspensions containing platelets having different ranges of thicknesses which are capable of producing multiple colors by reflection, curing said light transmitting plastic material, removing the cast plastic tube thus formed from said cylinder and slicing the tube lengthwise thereof to produce an iridescent cast plastic sheet having multiple colors formed integral therein.

3. The process as defined in claim 2, in which the nacre-producing platelets are constituted of basic lead carbonate and the light transmitting plastic material is a polyester casting resin.

4. The process as defined in claim 2, in which each of said suspensions of nacre-producing platelets is dispensed in one direction axially of the rotating cylinder, thereby forming parallel lines of the said platelets extending helically of the cast plastic tube thereby formed.

5. The process as defined in claim 2, in which at least one of said suspensions of nacre-producing platelets is dispensed bi-directionally of the axis of said rotating cyclinder, thereby forming a network of intersecting lines of the said platelets extending helically of the cast plastic tube thereby formed, said platelets extending across and through the thickness of said tube.

References Cited by the Examiner

UNITED STATES PATENTS

| | | | |
|---|---|---|---|
| 2,265,226 | 12/1941 | Clewell et al. | 18—58.3 |
| 2,856,635 | 10/1958 | Gerson et al. | 18—58.3 XR |
| 3,010,158 | 11/1961 | Broderson | 264—108 XR |
| 3,050,785 | 8/1962 | Cunningham | 264—73 XR |
| 3,071,482 | 1/1963 | Miller | 106—291 XR |
| 3,123,485 | 3/1964 | Miller et al. | 106—148 |

ALEXANDER WYMAN, *Primary Examiner.*

JACOB STEINBERG, EARL M. BERGERT, *Examiners.*